US008275365B1

United States Patent
Patvarczki et al.

(10) Patent No.: US 8,275,365 B1
(45) Date of Patent: Sep. 25, 2012

(54) METHOD AND SYSTEM FOR PROVIDING PRESENCE INFORMATION

(75) Inventors: Jozsef Patvarczki, Framingham, MA (US); Adam Kornafeld, Worcester, MA (US); Endre Tamas, Worcester, MA (US)

(73) Assignee: Hydrabyte, Inc., Worcester, MA (US)

( * ) Notice: Subject to any disclaimer, the term of this patent is extended or adjusted under 35 U.S.C. 154(b) by 38 days.

(21) Appl. No.: 12/896,820

(22) Filed: Oct. 1, 2010

(51) Int. Cl.
*H04L 29/06* (2006.01)

(52) U.S. Cl. .................. 455/414.3; 455/457; 455/456.1; 709/224; 379/201.02

(58) Field of Classification Search .................. 455/466, 455/505.1, 418, 457, 456.1; 379/218.01, 379/127.01, 88.21, 201.1; 709/206, 203, 709/204, 224, 207; 707/999.003, 999.201, 707/999.104, 922, E17.141, E17.005
See application file for complete search history.

(56) References Cited

U.S. PATENT DOCUMENTS

| | | | |
|---|---|---|---|
| 6,205,478 B1 | 3/2001 | Sugano et al. | |
| 7,219,303 B2 | 5/2007 | Fish | |
| 7,474,741 B2 | 1/2009 | Brunson et al. | |
| 2005/0080846 A1* | 4/2005 | McCleskey et al. | 709/202 |
| 2006/0058025 A1* | 3/2006 | Barrow | 455/433 |
| 2007/0032194 A1 | 2/2007 | Griffin | |
| 2007/0124721 A1* | 5/2007 | Cowing et al. | 717/100 |
| 2009/0147772 A1* | 6/2009 | Rao et al. | 370/352 |
| 2009/0215486 A1* | 8/2009 | Batni et al. | 455/550.1 |

* cited by examiner

*Primary Examiner* — Jean Gelin
*Assistant Examiner* — Mahendra Patel
(74) *Attorney, Agent, or Firm* — Altman & Martin; Steven K Martin

(57) ABSTRACT

A system and method for a user to send presence information to authorized contacts in her phone's address book and to receive the presence information of those contacts in her phone's address book that have authorized her. A user can authorize any contact in her address book. Optionally, a user can only authorize a contact and be authorized by a contact if she is in that contact's address book. A local application on the phone interacts with and displays the phone's address book, manages the authorization of contacts, updates the client's presence, and receives and displays the presence of contacts. The local application updates the client's presence manually, semi-automatically, or automatically. Semi-automatic updates involve synchronizing with the phone's calendar. Automatic updates may involve the use of location data, the phone's built-in sensors, and augmented reality.

7 Claims, 3 Drawing Sheets

METHOD AND SYSTEM FOR PROVIDING PRESENCE INFORMATION

BACKGROUND OF THE INVENTION

1. Field of the Invention

The present invention relates to telecommunications systems, more particularly, to networks of mobile phone users sharing common contacts.

2. Description of the Related Art

In computer and telecommunications networks, presence information is a status indicator that conveys the ability and willingness of a potential communication partner to communicate.

The second most basic feature of a telephone (including cell phone, desktop phone, wireless phone, etc.)—after the ability to make telephone calls—is the address book. An address book is a database used for storing entries called contacts. Each contact entry usually consists of a few standard fields (for example: first name, last name, company name, address, telephone number, e-mail address, fax number, and mobile phone number). In this document the term, address book, refers to this database and the term, phone, to refer to any phone equipped with an address book having the ability to access the Internet.

The act of someone storing a contact in the address book of her phone is an implicit indication that she knows the entity (a person or a company) that the contact is describing. It is also an implicit indication that the users of two phones know each other if the address book of each phone contains the contact information of the other person.

A number of systems exist include a means by which users can voluntarily announce their presence on the system. Relevant presence information, which is also referred to herein as "presence", is made available to those on the system that wish to receive the information.

BRIEF SUMMARY OF THE INVENTION

An object of the present invention is to facilitate user interaction in a network by exchanging presence information with each other.

The present invention allows a user to send presence information to authorized contacts in her phone's address book and to receive the presence information of those contacts in her phone address book that have authorized her. At its most basic, presence information is an indication of the availability of the user for phone calls and/or text messages. Optionally, presence can include additional information such as a short message, a picture, a video, and/or the physical location of the phone.

A basic hardware system includes wireless phone service that provides access to the Internet for each phone. Internet service providers provide Internet access for computers.

The system is implemented in a client-server (CS) architecture or a peer-to-peer (PP) architecture. The main element of the system is a local application running on the phone. Users register their phones to enable the local application and are referred to as clients. The system consists of one or more central servers that are responsible for handling registration of clients and storing system membership information and the history of each client. In the CS architecture, the central server as also responsible for handling the client connections and distributing the presence information. In the PP architecture, clients exchange presence with each other directly. A client can be any device that has an address book and display, and is capable of operatively connecting to the central server.

A link, a logical connection between two clients, is created when a first client authorizes a second client to access her presence. The system permits a user to authorize any contact in her address book. If the user is in the contact's address book and the contact is a client, access is granted immediately. Otherwise access is granted if and when the user is added to the contact's address book and the contact becomes a client. Optionally, a user can only authorize a contact and be authorized by a contact if she is in that contact's address book.

The local application interacts with the contacts in the phone's address book and presents them on the phone's display, manages the authorization of contacts, updates and announces the client's presence, and receives and displays the presence of contacts.

A graphical user interface of the local application displays an enhanced version of the phone's address book that includes a visual indicator of a contact's presence. Optionally, the enhanced address book display includes any other presence information associated with each contact.

The local application lets a user authorize or deauthorize a contact and any change of status is communicated to the affected contact, either through the central server in the CS architecture or directly to the contact in the PP architecture.

The local application can update the client's presence manually and/or, optionally, semi-automatically and/or automatically. A user can set her presence information manually via the GUI. Semi-automatic updates involve synchronizing the local application with the phone's internal calendar, external calendars, or web-based calendars. It can also include updating presence based on the phone's ring profile. Automatic updates involve the use of location data, the phone's built-in sensors (the microphone, motion-based sensors, and light sensors), and augmented reality.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present invention is a system that allows a user to send presence information to contacts in her phone's address book to whom she has granted permission—authorized—to receive her presence information—an authorized contact—and to receive the presence information of those contacts in her phone address book that have granted her permission to receive the presence information—an authorizing contact. Presence information can include several different parameters. The most basic form of presence is an indication as to whether or not the user is able to receive phone calls and/or wants to receive phone calls. Optionally, presence is an indication as to whether or not the user is able to receive text messages and/or wants to receive text messages. Optionally, such indications can also have a more detailed form in which the user specifies with a short message the reason for being or not being able to receive phone calls and/or text messages.

Optionally, presence can include a short message that describes the user's current situation and that can further include a picture or a video that describes the user's current status.

Optionally, presence can be combined with the physical location of the phone with an arbitrary geographical resolution ranging from the building the user is currently in, through the city the user is in, through the country or continent the user is in. Similarly, presence can include the time zone that the phone is in. The physical location of the phone can be determined in several ways, as described below.

Figure 1:
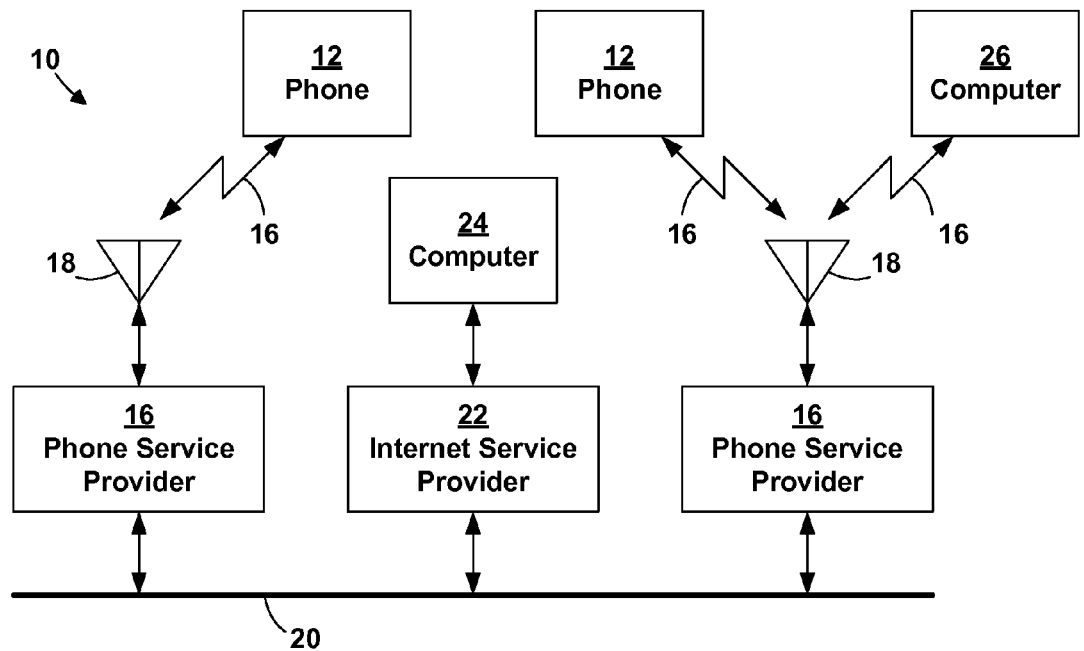
FIG. 1 is a hardware diagram of a basic cellular telephone and computer network system on which the present invention operates.

A basic hardware system 10 on which the present invention operates is shown in FIG. 1. The service for each phone 12 is provided by a wireless phone service provider 14, which provides a wireless telephone network and access to a global computer network 20, the Internet, as at 16. It does so via a network of antennas 18 and its associated infrastructure. Internet service providers 22 provide access to the Internet 20 for desktop and laptop computers 24. Computers 26 may also access the Internet 20 through a cellular phone service provider.

The system can be structured using a client-server (CS) architecture or a peer-to-peer (PP) architecture. With either architecture, the main element of the system of the present invention is an application running on the phone, referred to as the local application. The local application can be an element of the phone's operating system, pre-installed, or downloadable by the user. Phones running the local application act as clients or peers in the system, depending on the system architecture, and are referred to hereinafter as clients. Entries in a client's address book that are also clients are referred to hereinafter as contacts.

Figure 2:
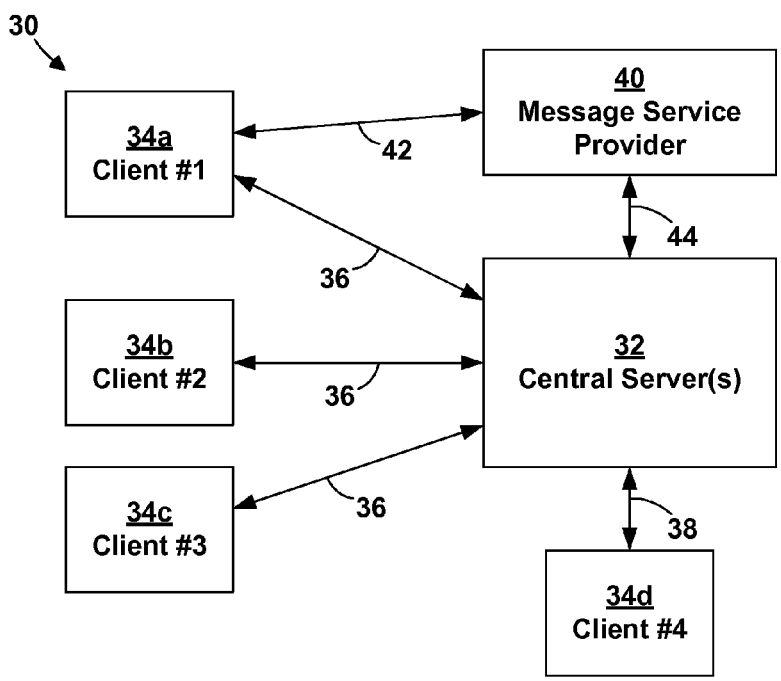
FIG. 2 is a logical diagram of the architecture of the system of the present invention.
Figure 3:
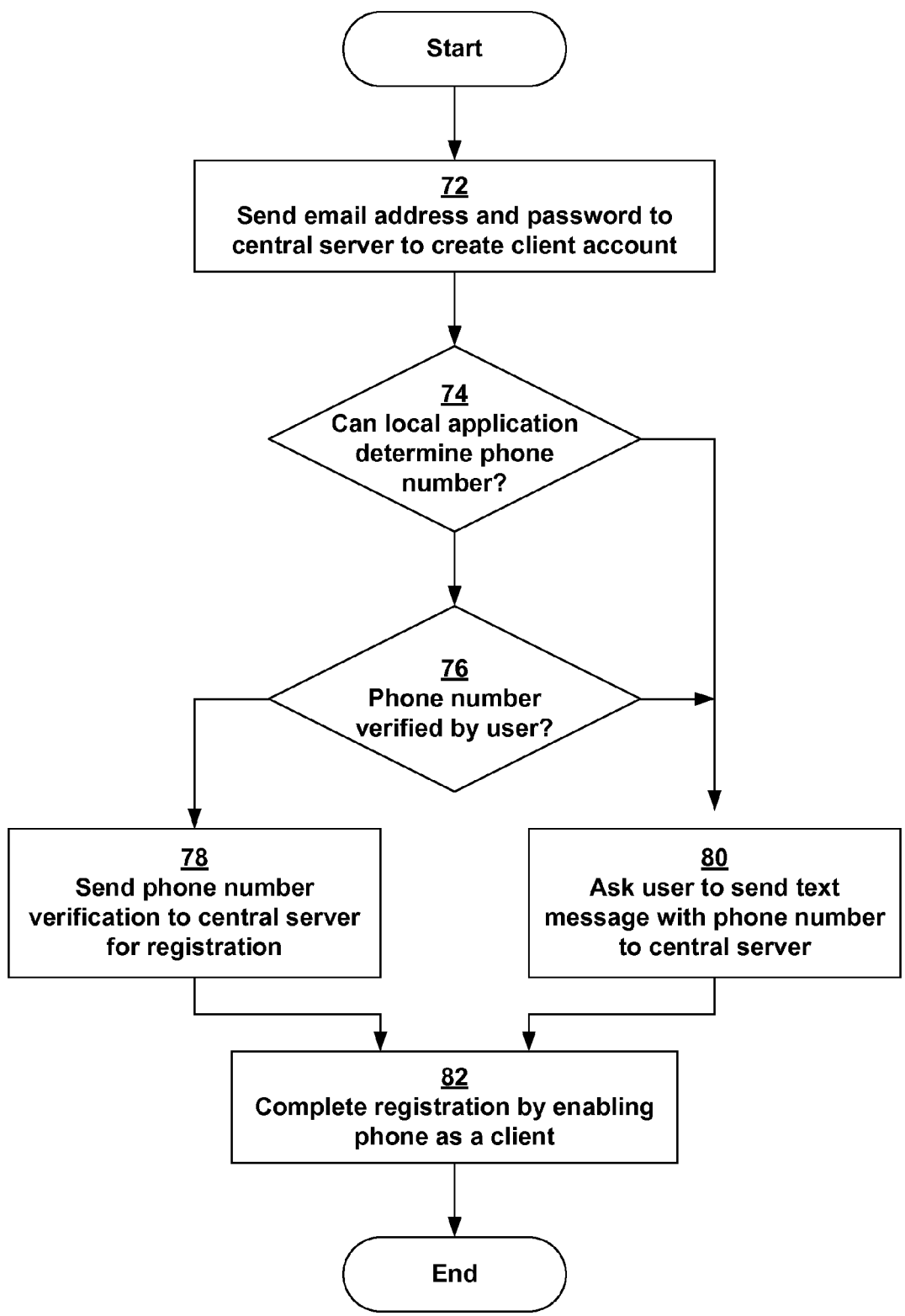
FIG. 3 is a flow diagram of the registration function of the local application.

A basic logical system 30 of the present invention is shown in FIG. 2. The system 30 consists of one or more central servers 32. The central server 32 is responsible for handling registration of clients 34a, 34b, 34c, 34d (collectively, 34). It also stores system membership information and the history of each client. History information can include when the client was last seen and changed her status. In the CS architecture, the central server 32 as also responsible for handling the connections for clients 34a, 34b, 34c, 34d and distributing the actual presence information among clients 34. In the PP architecture, clients 34 are able to exchange presence with each other without the assistance of the central server 32.

The present invention contemplates that a client 34 can be any device that has an address book and display, and is capable of operatively connecting to the central server 32. Each phone client 34a, 34b, 34c is operatively connected to the central server 32 through its phone service provider and the Internet, as at 36. A desktop client 34d can be operatively connected to the central server 32 through the Internet, as at 38. Clients 34 may also be operatively connected to third party message service providers 40 through its phone service provider and the Internet, as at 42, and the third party message service providers 40 are operatively connected to the central server 32 through the Internet, as at 44. The phone service providers and message service providers 40 are responsible for validating clients' phone numbers during the registration process, as described below. Once the registration process is complete, clients 34 in the CS architecture send their own presence information to the central server 32 and/or retrieve presence information of authorizing contacts from the central server 32. In the PP architecture, clients 34 send their own presence information to authorized contacts and/or retrieve presence information of authorizing contacts.

The system identifies clients by their phone numbers. Optionally, for security reasons, the system uses and stores a cryptographic hash of each phone number so that phone numbers are not stored in an easily readable form.

The system can create a map of all of the links between clients, where a link is a logical connection between two clients. Whether a link is actually created between two clients depends on whether or the first client wishes to share her presence with the second client. For example, if a client Alice authorizes a client contact Bob in her address book to access her presence information, the system creates and stores a unidirectional link between the phone numbers of Alice and Bob. In order to make the link bidirectional, Bob must have Alice in his address book and authorize her to access his presence information. The map of linked clients represents a network that describes the connections between clients. By providing presence to others, clients can interact with each other in a social networking way.

The map of linked clients is stored as a data base in the central server or distributed among the clients, depending on the system architecture, as described above. The structure of the data base is not an aspect of the present invention and any type of structure that is adequate to the task can be used.

As described above, a link is only created if a user authorizes a contact. In one configuration, the user initially authorizes all or a defined group of contacts in her address book and links are created to those contacts. The user can then revoke authorization on a per contact or per group basis after the links are created. If the authorization for a contact is revoked, the system removes that particular link from the map and the contact in no longer authorized. For example, if Alice's address book includes Bob and Carl, those two links will initially be created. If Alice subsequently revokes authorization for Bob, the link to Bob will be removed while the link to Carl will remain.

In another configuration, the user decides whom to authorize prior to the initial links being created. For example, if Alice's address book includes Bob and Carl but only Carl is authorized, only a link to Carl will be created. If Alice subsequently authorizes Bob, a link to Bob will then be created.

The system permits a user to authorize any contact in her address book. If the user is in the contact's address book and the contact is a client, access is granted immediately. If the contact is not a client or the user is not in the contact's address book, the authorized contact may not know of the authorization. Once the user is added to the contact's address book and the contact becomes a client, the contact is notified of the authorization status. For example, if client Bob is in client Alice's address book but Alice is not in Bob's address book, Alice can authorize Bob, but Bob will not be able to access Alice's presence. Once Bob enters Alice into his address book, he can access Alice's presence.

Optionally, the system utilizes a security model that allows authorization only between clients that are verified to know each other. A user can only authorize a contact and be authorized by a contact if she is in that contact's address book. If Alice authorizes Bob, then Bob can access Alice's presence but only if Alice is in Bob's address book. However, Alice cannot access Bob's presence unless Bob also authorizes Alice. Both Alice and Bob can give and withdraw authorization for other contacts to access their presence. With this approach, the system provides users with full control over whom they share their presence with at any point in time.

Preferably, a user registers with the system to become a client. There are currently two methods of registration contemplated, however, any method that is adequate for the present invention can be used.

In one method of registration, the user either runs or downloads and runs the local application. Through the local application, the user registers her email address with an encrypted password to create a client account, as at 72. If the local application is capable of determining the phone's phone number, as at 74, it will ask the user to verify the number, as at 76. If the user verifies the number, the local application sends it to the central server, as at 78. If the local application is not capable of determining the device's phone number or the user does not verify the phone number, the local application asks the user to send a text message to the central server with the phone number, as at 80. Once the central server receives the phone number, registration is completed by enabling the phone as a client, as at 82.

In another method of registration, the user can register using a Web interface, such as a Web browser. The user creates the client account with an email address and an encrypted password. The user can then register phone numbers.

Upon registration, the client's phone number acts as a unique username that can be replaced with a specific character combination, such as the phone number encrypted, to increase the security of the system.

Figure 4:
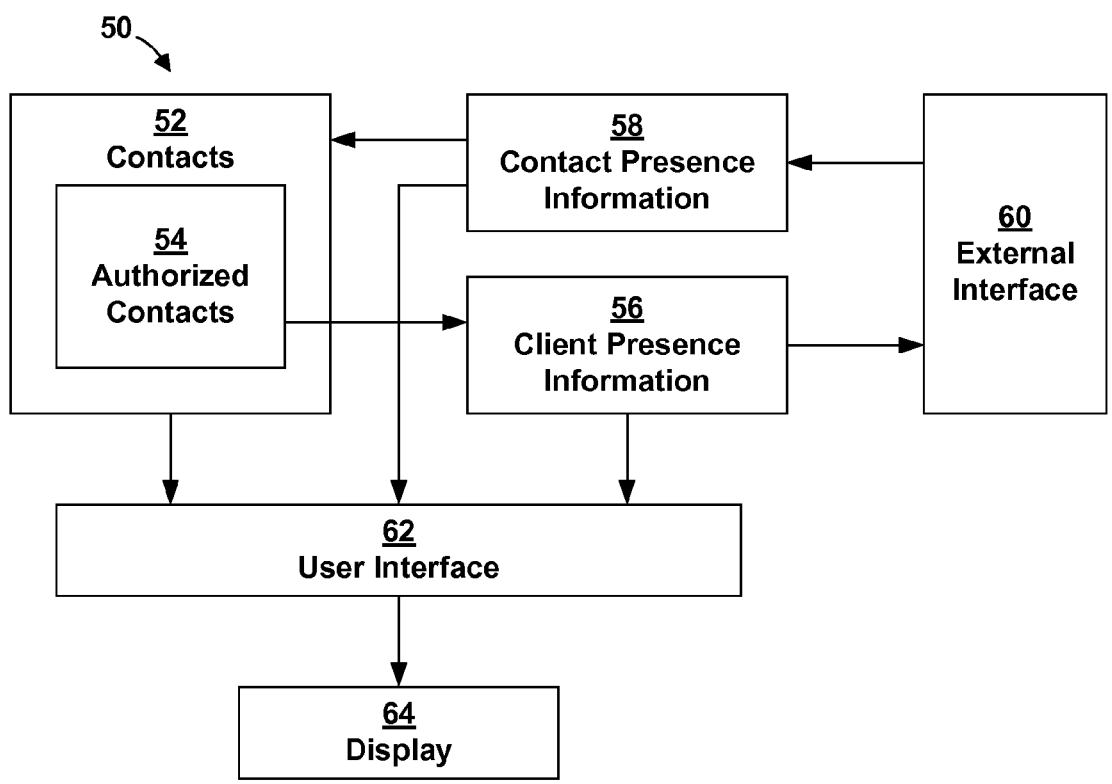
FIG. 4 is a block diagram of how the local application interacts with the phone.

The local application 50, a diagram of which is shown in FIG. 4, provides the following functions for the client: (1) interacting with the contacts 52 in the phone's address book and presenting them on the phone's display 64; (2) managing the authorization of contacts to access the client's presence 54; (3) updating and announcing the client's presence manually and/or, optionally, semi-automatically and/or automatically 56 via the phone's external interface 60; and (4) receiving and displaying the presence of contacts 58 via the external interface 60.

The graphical user interface (GUI) 62 of the local application displays an enhanced version of the phone's address book. At a minimum, the enhancement consists of a visual indicator of a contact's presence. Such an indication can be by an icon or a color. The user can check the status of each contact by looking at the visual indicator associated with the contact. If a contact has not authorized the client to access his presence, the present invention contemplates that the indicator may show the contact as unavailable, that there may be no indicator at all, or that there may be a special indicator. Optionally, the enhanced address book display includes any other desired presence information associated with a given contact, such as text (e.g., the status message), audio (e.g., a sound effect or audio message), video (e.g., status video), or location data.

A contact menu option or softkey enables the user to authorize or deauthorize a contact. When a contact is authorized or deauthorized, that change in status is communicated to the affected contact via the phone's external interface. In the CS architecture, the local application notifies the central server of the status change, which then notifies the affected contact. In the PP architecture, the client notifies the affected contact of the status change directly.

Whenever any presence information is changed either manually, semi-automatically, or automatically, the present invention contemplates several possibilities for distributing that change to its authorized contacts. In the CS architecture, the local application sends the client's presence to the central server via the external interface. Once the presence information in the central server is updated, how the authorized clients receive the updated presence depends on whether the present invention uses a push model or a pull model. In the push model, the central server forwards the updated presence information to each of the authorized contacts. In the pull model, each client periodically queries the central server for updates in the presence of any of its authorizing contacts. In the PP architecture using a push model, the local application sends the updated client's presence to each authorized contact. In the PP architecture using a pull model, a client periodically queries each of its authorizing contacts for changes in presence.

As described above, the local application can update the client's presence manually and/or, optionally, semi-automatically and/or automatically. A user can set her presence information manually via the GUI. After presence is set manually, the new setting is available. In the CS architecture, the new presence is sent to the central server. In the PP architecture, the new presence is either sent or available to authorized contacts depending on whether the system is employing a push or pull model.

For other than manual presence changes, the local application checks for a change of presence periodically at preset intervals. The interval is typically on the order of five minutes, but can be changed manually or dynamically adjusted based on the load of on the system.

Changing presence semi-automatically involves synchronizing the local application with the phone's internal calendar, external calendars, or web-based calendars. With this method, the start and end dates and times of scheduled meetings, appointments, and the like cause the local application to set presence. This method also supports the manual override of presence.

Optionally, updating presence semi-automatically can include changing presence based on the phone's ringing profile. For example, if a user changes her ring profile to silent or vibrate only, the system can be set to automatically change her presence to unavailable.

Many phones can provide location data that local applications can use for location-based services. For example, a phone may be equipped with a positioning system (e.g., GPS). Moreover, phones can usually communicate via several different wireless technologies (e.g., cellular, Wi-Fi, Bluetooth, and mobile internet). A cellular phone can estimate its location using cellular network data. A Wi-Fi-capable phone can determine its location using wireless signal data. In the event a phone itself does not provide location data, active wireless network signals can be used to determine the location of the device. The client might manually associate an active wireless network connection with a specific location. Some phones combine these technologies to provide enhanced location data. Alternatively, the client might manually enter her specific location.

The local application can utilize different built-in sensors of the phone to change presence automatically in conjunction with location data. The phone's microphone, motion-based sensors, light sensors, and other sensors can be utilized in combination to trigger a change of presence automatically, as described below. Also, the identifier of an active wireless network hot-spot or a Bluetooth system can trigger a presence change automatically. This method also supports manual override of presence.

The microphone of a phone can be used to sample the ambient noise. The sample can be compared to and matched with common noises such as traffic while walking, a car while sitting inside, public places such as malls, an office, walking with the phone in the pocket, and a household, such as a television turned on. clients' presence can be automatically set based on a match of such sampling.

Motion-based data supplied by a phone can also be sampled. The sample can be compared to and matched with specific human motions such as walking. The client's presence can be automatically set based on a match of such sampling. For example, a client can manually set her status to be offline while sitting in a meeting. After the meeting is over, the client usually walks away from the meeting venue, but she might forget to set her status back to online. By detecting a walking motion paired with a change in the ambient noise, the local application can automatically set the client's presence to online.

Light sensor data supplied by a phone can be used to help set the client's presence automatically. Light sensor data can be matched with the time of day to deduce a client's presence. For example, a dark environment with the ambient noise of a movie can be interpreted as the client being in a movie theater and her presence can automatically be set to do not disturb.

These sampling techniques can also be used in conjunction with each other to further enhance the performance of the system.

The system can also leverage the properties of augmented reality. The location of a client's friends can be determined by extracting location information from the presence of the client's client contacts. The local application can display the live camera image of the phone the local application is running on and indicate if a client contact of the client is in the direction that falls in the angle of view of the camera by utilizing location data supplied by the phone. As an example of usage of this feature, a client could point her phone's camera running the local application into a meeting room while standing outside of the room behind closed doors and determine which colleagues are attending the meeting without actually interrupting the meeting by knocking on the door.

Thus it has been shown and described a system and method for providing presence information which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A system for distributing presence information among a plurality of phones operated by a corresponding user and identified by a phone number, said system comprising:
   (a) said plurality of phones operatively connected to each other through at least one wireless phone network;
   (b) each of said phones having an address book with at least one contact;
   (c) each of said phones having a display on which said address book can be viewed by said user;
   (d) each of said phones running a local application with access to said address book and said display, said local application including instructions for carrying out a method for distributing said presence information among a plurality of phones, said method comprising the steps of:
   (1) accepting a change in authorization for said contact from said user and identifying said contact that is authorized as an authorized contact, verifying that said phone is in said contact's address book before authorizing said contact, said phone having a link with said authorized contact through said at least one wireless phone network;
   (2) updating said presence information of said phone;
   (3) making said presence information available directly to said authorized contact through said link, wherein said presence information is pushed to said authorized contact or sent in response to a query from said authorized contact;
   (4) acquiring said presence information from said contact through said link if said phone is an authorized contact of said contact; and
   (5) including said presence information from said contacts for which said phone is an authorized contact when displaying said address book on said display.

2. The system of claim 1 wherein said method further comprises pushing said presence information to said authorized contact.

3. The system of claim 1 wherein said method further comprises sending said presence information to said authorized contact in response to a query from said authorized contact.

4. The system of claim 1 wherein said method further comprises sending said change in authorization to said contact affected by said change.

5. The system of claim 1 wherein said method further comprises sending said change in authorization to said contact affected by said change through a server.

6. The system of claim 1 wherein said presence information includes the location of said phone.

7. The system of claim 1 wherein said presence information includes a message describing a situation of said user.

* * * * *